(12) United States Patent
Shen et al.

(10) Patent No.: US 7,895,392 B2
(45) Date of Patent: Feb. 22, 2011

(54) COLOR-BASED CACHE MONITORING

(75) Inventors: Xiaowei Shen, Hopewell Junction, NY (US); David F. Bacon, Sleepy Hollow, NY (US); Robert W. Wisniewski, Ossining, NY (US); Orran Krieger, Newton, MA (US)

(73) Assignee: International Business Machines, Armonk, NY (US)

( * ) Notice: Subject to any disclaimer, the term of this patent is extended or adjusted under 35 U.S.C. 154(b) by 754 days.

(21) Appl. No.: 11/620,348

(22) Filed: Jan. 5, 2007

(65) Prior Publication Data
US 2008/0168230 A1 Jul. 10, 2008

(51) Int. Cl.
G06F 12/00 (2006.01)
G06F 13/00 (2006.01)
G06F 13/28 (2006.01)

(52) U.S. Cl. ................... 711/113; 711/118; 711/133; 711/134; 711/141; 711/154

(58) Field of Classification Search ......... 711/118–146, 711/113, 154
See application file for complete search history.

(56) References Cited

U.S. PATENT DOCUMENTS

| | | | |
|---|---|---|---|
| 5,963,972 A * | 10/1999 | Calder et al. ............... | 711/129 |
| 6,321,240 B1 | 11/2001 | Chilimbi | |
| 6,330,556 B1 | 12/2001 | Chilimbi | |
| 6,477,634 B1 * | 11/2002 | Comment .................. | 711/207 |
| 6,654,859 B2 | 11/2003 | Wooldridge | |
| 7,200,721 B1 * | 4/2007 | Lang et al. ................. | 711/141 |
| 7,395,279 B2 * | 7/2008 | Iyengar et al. ............. | 1/1 |
| 7,434,002 B1 * | 10/2008 | Zedlewski et al. ......... | 711/130 |
| 7,581,064 B1 * | 8/2009 | Zedlewski et al. ......... | 711/118 |
| 2007/0157003 A1 * | 7/2007 | Durham et al. ............ | 711/206 |

FOREIGN PATENT DOCUMENTS

JP 2000339220 A 12/2000

OTHER PUBLICATIONS

Rui Min and Yiming Hu, "Improving Performance of Large Physically Indexed Caches by Decoupling Memory Addresses from Cache Addresses", 2001, IEEE Transactions on Computers, vol. 50, Issue 11, pp. 1191-1201.*

U.S. Appl. No. 11/620,293, filed Jan. 5, 2007, Xiaowei Shen.

U.S. Appl. No. 11/620,323, filed Jan. 5, 2007, Xiaowei Shen.

Edouard Bugnion, Jennifer M. Anderson, Todd Mowry, Mendel Rosenblum, and Monica S. Lam, "*Compiler-Directed Page Coloring for Multiprocessors*", 1996 ACM.

(Continued)

Primary Examiner—Yaima Campos
(74) Attorney, Agent, or Firm—Ference & Associates LLC

(57) ABSTRACT

Color-based caching allows each cache line to be distinguished by a specific color, and enables the manipulation of cache behavior based upon the colors of the cache lines. When multiple threads are able to share a cache, effective cache management is critical to overall performance. Color-based caching provides an effective method to better utilize a cache and avoid unnecessary cache thrashing and/or pollution. The color based caching can be monitored to improve memory performance and guarantee Quality-Of-Service of cache utilization.

19 Claims, 2 Drawing Sheets

| Index | Tag | MESI | Color | Data |
|---|---|---|---|---|
| 0 | 0 | 0 | 1 | Abc |
| 1 | 2 | 1 | 1 | Def |

Exemplary Implementation of Cache Table Using Color-based Caching

OTHER PUBLICATIONS

John Kalamatianos and David R. Kaeli, *Temporal-based Procedure Reordering for Improved Instruction Cach Performance*, Proceedings of 1998 Fourth International Symposium on High-Performance Computer Architecture (Cat. No. 98TB100224), pp. 244-253, Published Los Alamitos, CA, USA 1998.

* cited by examiner

| Index | Tag | MESI | Data |
|---|---|---|---|
| 0 | 0 | 0 | Abc |
| 1 | 2 | 1 | def |

Figure 1: Prior Art Cache Table

| Index | Tag | MESI | Color | Data |
|---|---|---|---|---|
| 0 | 0 | 0 | 1 | Abc |
| 1 | 2 | 1 | 1 | Def |

Figure 2: Exemplary Implementation of Cache Table Using Color-based Caching

COLOR-BASED CACHE MONITORING

This invention was made with Government support under Contract No.: NBCHC020056 PERCS I awarded by DARPA. The Government has certain rights in this invention.

FIELD OF THE INVENTION

The present invention relates generally to an architecture support that allows software to classify memory accesses to improve performance and guarantee Quality-of-Service of cache utilization.

BACKGROUND OF THE INVENTION

Processors have become very fast in comparison to memory. This difference in speed has continued to widen over the past years with advances in technology. Consequently, this gap between processor and memory speed has created a "memory wall", whereby the processor is often times starved with nothing to do while waiting for memory. This problem is significantly exacerbated on SMT (Simultaneous Multi-Threaded) processors as threads collide with each other, and on multiprocessor systems as many processors attempt to access from the same memory that is farther away.

Caches are an attempt to alleviate the high cost of going to memory by keeping certain expected-to-be important data items in fast memory that is close to the processor. These data items are kept in cache-lines. The cache lines are tagged using the memory address where the data item is stored. Because a cache is usually much smaller than the main memory, many memory addresses are mapped to the same cache line.

In modern microprocessors, memory access operations from different applications and the operating system are treated identically at the cache and memory side. When a cache or memory receives a memory access operation, it is usually unable to distinguish which thread (or process) has issued the memory request. This causes several problems in terms of interference, cache performance, quality of service guarantees, and efficiency.

One such problem, in terms of interference is caused because of the lack of distinction of which cache lines are used by the Operating System and which cache lines are used by the application. Thus, Operating System data and application data may interfere with each other.

Another problem occurs because of the lack of distinction between cache lines used by different threads. Cache performance of an important thread can be affected, and suffer, when cache lines are evicted prematurely by another thread. Quality-of-Service guarantees also suffer as a consequence because it is impossible to guarantee that a thread will not evict data cached by another thread. An example of such a problematic situation arises with the ability to guarantee correctness of a program. The memory system generally needs to be conservative to ensure correctness of the program. For example, when a memory barrier instruction, such as the PowerPC's SYNC instruction, is executed, it must be guaranteed that all of the previous memory accesses be completed before the memory barrier instruction completes. In fact, it is generally sufficient to guarantee the memory ordering for memory accesses from the same thread (or process). However, valuable information is lost because the memory system cannot distinguish between memory access operations from different threads (or processes) and thus there is no assurance of the correctness of the program or consequently of Quality-of-Service.

A fourth, and somewhat dissimilar problem, occurs because software cannot explicitly affect cache line placement and replacement. For example, it is impossible for software to specify a set of cache lines for a streaming application. As is evident, efficiency suffers as a result of the inability of software to have a small amount of control over cache lines or the data placed in certain cache lines. Currently, there are no known limitations or specifications such as those of the instant invention in place to prevent a streaming thread utilizing the cache from thrashing the cache of the other threads. Specifically, performance of the other threads in the application would improve if a few of the cache lines were specified for the streaming thread. Although the performance of the streaming thread will not be affected, the streaming thread will not thrash the cache of the other threads and thus will significantly improve efficiency and performance of the other threads utilizing the cache.

Thus, there exists a need in the art for a color-based cache monitoring system that improves memory performance and efficiency, guarantees quality-of-service, and removes interference issues.

SUMMARY OF THE INVENTION

This present invention relates to color-based caching. Color-based caching provides architecture support that allows software to classify memory accesses into different congruence classes by specifying a color for each memory access. This type of caching further enables the manipulation of cache behavior based upon the colors of the cache lines. When multiple threads are able to share a cache, effective cache management is critical to overall performance. Color-based caching provides an effective method to better utilize caches and avoid unnecessary cache thrashing and pollution.

In one aspect, the present invention provides an apparatus for guaranteeing Quality-Of-Service of cache utilization, said apparatus comprising a generator that generates memory access operations in response to software, an assignor that assigns a color to memory access operations, a receiver that receives and records color information for each cache line based upon the operation utilizing the cache line, wherein the hardware is able to distinguish between memory access operations with different colors.

In another aspect, the present invention provides a method of guaranteeing Quality-Of-Service of cache utilization, said method comprising the steps of generating memory access operations in response to software, assigning a color to memory access operations, receiving and recording color information for each cache line based upon the operation utilizing the cache line, wherein the hardware is able to distinguish between memory access operations with different colors.

In a third aspect, the present invention provides a program storage device readable by machine, tangibly embodying a program of instructions executable by the machine to perform method steps for guaranteeing Quality-Of-Service of cache utilization, said method comprising the steps of generating memory access operations in response to software, assigning a color to memory access operations, receiving and recording color information for each cache line based upon the operation utilizing the cache line, wherein the hardware is able to distinguish between memory access operations with different colors.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 shows cache table of the prior art that is using the MESI protocol

FIG. 2 shows an exemplary implementation of color-based memory semantics according to the present invention.

DETAILED DESCRIPTION OF THE PREFERRED EMBODIMENTS

Several other co-pending and commonly owned U.S. patent applications, filed concurrently herewith, disclose various processes and arrangements whose details may, in the role of background information, help provide a better understanding of one or more of the embodiments disclosed and contemplated herein. Accordingly, those applications are hereby fully incorporated by reference as if set forth in their entirety herein, and are as follows (including the title and attorney docket number for each one): "Memory Access Coloring" application Ser. No. 11/620,293 and "Cache Coherence Monitoring and Feedback" application Ser. No. 11/620, 323.

This disclosure relates to color-based caching. Color-based caching allows each cache line to be distinguished by a specific color, and enables the manipulation of cache behavior based upon the colors of the cache lines. When multiple threads are able to share a cache, effective cache management is critical to overall performance. Color-based caching provides an effective method to better utilize a cache and avoid unnecessary cache thrashing and/or pollution. Color-based caching is carried out by both the Operating System and the software. Specifically, the Operating System, in coordination with the software, can dynamically determine the characteristics of given threads and assign cache lines colors that correspond to these threads. Thus, data from certain threads that are distinguished by certain characteristics or colors will be maintained on cache lines that are also distinguished by that specific color.

This color information is received and recorded by the hardware at the cache. Each cache line, corresponding to a memory access operation by a thread, has a color assigned to it. Although these colors may be thought of in an abstract sense as a finite "palette" of colors including "red" and "blue" and so forth, this "palette" of colors is in essence simply a finite amount of distinguishers of sets.

In the prior art, there are numerous cache coherency protocols, such as MOESI, in which cache lines maintain certain bits to signify state. In the MOESI protocol, two bits are used to signify the state of the cache line. These bits represent several distinct cache states that are well-known in the art (Modified, Owned, Exclusive, Shared, and Invalid). FIG. 1 depicts a cache table of the prior art that is using the MOESI protocol. There are other similar protocols that are well-known in the art which use these or similar bits to maintain state or other information that enables better cache coherency and efficiency.

The present invention maintains color state in the cache line, such that each cache line has a color. FIG. 2 depicts an embodiment of a cached color table, according to the present invention. The coloring of the instant invention is implemented through the hardware, specifically through color-based counters. The hardware is able to maintain a counter for each color that records the number of cache lines with the specific color in the cache (or cache set or cache way).

In general, the hardware can maintain the counters as a 2-dimensional matrix (event, C), or a 3-dimensional matrix (event, C1, C2). The counter (event, C) represents the number of times that a specific event happens on color C. The counter (event, C1, C2) represents the number of times that color C1 interacts with color C2 with respect to a specific event. An event can be a cache hit, a cache miss, or a cache line replacement. For example, the counter (replacement, C1, C2) represents the number of times that a cache line with color C1 has replaced a cache line with color C2. The cache controller can use the color-based monitoring information when making cache line replacement decisions. In practice, hardware may merge multiple counters to reduce the implementation cost (it is unnecessary to distinguish between every possible event).

Each memory transaction carries a color that will be assigned to the corresponding cache line. Colors can be assigned based on control or data. There are numerous ways in which colors can be assigned to cache lines or used to distinguish memory transactions. One such way allows software to use a dedicated color for memory accesses of a specific thread, or memory access of method invocation (e.g. an asynchronous function call). Software can also use different colors for different memory regions to monitor cache behaviors based on addresses. A further method enables software to use different colors to distinguish memory accesses generated by the Operating System and applications.

The Operating System or software decides how colors should be used. The Operating System can lock in a certain number of cache lines for real-time threads, or those requiring Quality-of-Service memory guarantees. The Operating System is also aware of the priority of various threads, and can appropriately assign more lines of a given color to applications with a higher priority. The Operating System also knows which memory addresses have been allocated to a given process or thread, and can assign color and color transactions to better match its memory allocation algorithm. For example, if it is possible for different colors to have a different memory to cache mapping, the Operating System could improve the cache performance by changing color based on the mappings it has established for different processes.

The system can also use the color-based information to provide Quality-of-Service in terms of cache utilization. The Operating System is capable of manipulating cache behavior for different colors. There are numerous examples of this manipulation. One such example includes the ability of the Operating System to specify different utilization percentages for different colors, thus specifying a varied numbers of cache lines for various threads or processes. Different priorities can also be given to different colors, depending on the priority of the associated thread. For example, a thread corresponding to a user-initiated download may be given higher priority than a non-vital background system check that occurs at pre-determined intervals. Further, the Operating System can specify that certain cache hit ratios can be guaranteed for specific colors whenever possible. This type of manipulation may be utilized in the case of a real-time thread, ensuring that certain Quality-Of-Service guarantees may be upheld and maintained.

The hardware is able to implement these cache behavior manipulations by providing appropriate color-related cache utilization information to the cache replacement mechanism. For example, the replacement mechanism can be notified that specific colors should be considered first, or before others, as a replacement victim since the thread represented by the color has used more cache space than expected.

The color-based cache monitoring also provides a mechanism to effectively partition caches into separate regions for different uses. The system can dedicate part of a cache (for example, one associative way) to a specific color used by a streaming application, as mentioned above. This prevents the streaming applications from thrashing the data of other programs without sacrificing its own performance. It can also provide Quality-Of-Service guarantees by ensuring that a specific thread has a high cache hit through the provisioning of a certain amount of a cache to be utilized by that thread.

The color-based cache monitoring effectively enables the enforcement of different memory consistency semantics for different colors at the same time. For example, the system can ensure Sequential Consistency for an OS thread, while providing some weaker memory semantics for an application thread. Further, the system can guarantee that all load and store operations are preformed in order for a memory region, while allowing loads to overtake stores for a different memory region. For example, when a memory barrier instruction, such as the PowerPC's SYNC instruction, is executed, it must be guaranteed that all of the previous memory accesses be completed before the memory barrier instruction completes. In fact, it is generally sufficient to guarantee the memory ordering for memory accesses from the same thread (or process). With respect to the example of a SYNC instruction, the color-based caching of the instant invention enables the system to guarantee that all previous load and store operations with the same color are completed before the SYNC instruction is completed.

In summary, this invention relates to color-based caching. Color-based caching allows each cache line to be distinguished by a specific color, and enables the manipulation of cache behavior based upon the colors of the cache lines. When multiple threads are able to share a cache, effective cache management is critical to overall performance. Color-based caching provides an effective method to better utilize caches and avoid unnecessary cache thrashing and pollution.

If not otherwise stated herein, it is to be assumed that all patents, patent applications, patent publications and other publications mentioned and cited herein are hereby fully incorporated by reference herein as if set forth in their entirety herein.

What is claimed is:

1. An apparatus comprising:
   one or more caches comprising one or more cache lines;
   a generator that generates memory access operations in response to software;
   an assignor that assigns a cache line color corresponding to the memory access operations;
   a receiver that receives and records a color state for each cache line in the one or more caches based upon the cache line color assigned, such that the memory access operations are distinguished by the cache line color and one or more cache lines are also distinguished by the cache line color; and
   a hardware maintained matrix comprising counters corresponding to cache line colors, the counters comprising:
      a counter representing a number of times that a specific event happens on a cache line color; and
      a counter representing the number of times that a cache line color interacts with another cache line color with respect to a specific event;
   wherein a specific event comprises one or more of a cache hit, a cache miss and a cache line replacement;
   wherein the behavior of the one or more caches is manipulated based on color information of the memory access operations.

2. The apparatus according to claim 1, wherein the color state is a thread identifier corresponding to a thread that issued the memory access operations, a process identifier corresponding to a process that issued the memory access operations, or a processor identifier corresponding to a processor that issued the memory access operations.

3. The apparatus according to claim 1, wherein the assignor assigns cache line colors based on at least one of the following: memory regions, data structures, function calls, threads, processes, or processors.

4. The apparatus according to claim 3, wherein the assignor assigns a different cache line color to each of one or more threads and the behavior of the one or more caches is manipulated based on color information such that threads of a specific cache line color are given a higher cache priority than threads not of the specific cache line color.

5. The apparatus according to claim 3, wherein the assignor assigns different cache line colors based on threads and the behavior of the one or more caches is manipulated based on color information to enforce different memory consistency semantics for the different cache line colors at the same time.

6. The apparatus according to claim 3, wherein the assignor assigns different cache line colors to different memory regions and the behavior of the one or more caches is manipulated based on color information such that all load and store operations are performed in order for a particular memory region.

7. The apparatus according to claim 1, wherein the assignor assigns a color based on instructions from an Operating System running on the apparatus.

8. The apparatus according to claim 7, wherein an instruction from the Operating System comprises locking a certain number of cache lines in the one or more caches to be utilized with a certain cache line color.

9. The apparatus according to claim 8, wherein the Operating System locks a certain number of cache lines for cache line colors associated with threads that require Quality-Of-Service memory guarantees.

10. The apparatus according to claim 8, wherein an instruction from the Operating System comprises specifying different utilization percentages for different cache line colors, giving different priorities to different cache line colors, or guaranteeing a cache hit ratio for a specific cache line color.

11. The apparatus according to claim 1, further comprising:
    a replacement mechanism configured to consider a cache line having a color state as a replacement victim before one or more other cache lines having one or more other color states.

12. A method comprising:
    generating memory access operations in response to software;
    assigning a cache line color corresponding to the memory access operations;
    receiving and recording a color state for each cache line in one or more caches based upon the cache line color assigned, such that the memory access operations are distinguished by the cache line color and one or more cache lines are also distinguished by the cache line color; and
    maintaining a matrix in hardware comprising counters corresponding to cache line colors, the counters comprising:
       a counter representing a number of times that a specific event happens on a cache line color; and a counter representing the number of times that a cache line color interacts with another cache line color with respect to a specific event;

wherein a specific event comprises one or more of a cache hit, a cache miss and a cache line replacement;

wherein the behavior of the one or more caches is manipulated based on color information of the memory access operations.

13. The method according to claim 12, wherein the color state is a thread identifier corresponding to a thread that issued the memory access operations, a process identifier corresponding to a process that issued the memory access operations, or a processor identifier corresponding to a processor that issued the memory access operations.

14. The method according to claim 12, wherein the assignor assigns cache line colors based on at least one of the following: memory regions, data structures, function calls, threads, processes, or processors.

15. The method according to claim 12, wherein the assignor assigns a color based on instructions from an Operating System.

16. The method according to claim 15, wherein an instruction from the Operating System comprises locking a certain number of cache lines in the one or more caches to be utilized with a certain cache line color.

17. The method according to claim 16, wherein the Operating System locks a certain number of cache lines for cache line colors associated with threads that require Quality-Of-Service memory guarantees.

18. The method according to claim 15, wherein an instruction from the Operating System comprises specifying different utilization percentages for different cache line colors, giving different priorities to different cache line colors, or guaranteeing a cache hit ratio for a specific cache line color.

19. A program storage device readable by machine, tangibly embodying a program of instructions executable by the machine to perform steps for guaranteeing Quality-Of-Service of cache utilization, said steps comprising:

generating memory access operations in response to software;

assigning a cache line color corresponding to the memory access operations;

receiving and recording a color state for each cache line in one or more caches based upon the cache line color assigned, such that the memory access operations are distinguished by the cache line color and one or more cache lines are also distinguished by the cache line color; and maintaining a matrix in hardware comprising counters corresponding to cache line colors, the counters comprising:

a counter representing a number of times that a specific event happens on a cache line color; and a counter representing the number of times that a cache line color interacts with another cache line color with respect to a specific event;

wherein a specific event comprises one or more of a cache hit, a cache miss and a cache line replacement;

wherein the behavior of the one or more caches is manipulated based on color information of the memory access operations.

* * * * *